United States Patent [19]

Redmon, Jr. et al.

[11] Patent Number: 4,968,077
[45] Date of Patent: Nov. 6, 1990

[54] PORTABLE HAND HOLD DEVICE

[75] Inventors: John W. Redmon, Jr., Huntsville; Donald H. McQueen, Pinson; Fred G. Sanders, Huntsville, all of Ala.

[73] Assignee: The United States of America as represented by the Administrator National Aeronautics and Space Administration, Washington, D.C.

[21] Appl. No.: 363,819

[22] Filed: Jun. 9, 1989

[51] Int. Cl.⁵ ........................... B25B 9/04; B65G 9/00
[52] U.S. Cl. ..................................... 294/16; 294/119.1
[58] Field of Search .................. 294/16, 119.1, 34, 62, 294/903

[56] References Cited

U.S. PATENT DOCUMENTS

| | | |
|---|---|---|
| 2,835,527 | 5/1958 | Young ..................................... 294/16 |
| 4,261,609 | 4/1981 | Kraszewski et al. ............. 294/119.1 |
| 4,632,631 | 12/1986 | Dunlap .......................... 294/119.1 X |
| 4,707,013 | 11/1987 | Vranish et al. .............. 294/119.1 X |

Primary Examiner—Margaret A. Focarino
Assistant Examiner—Dean J. Kramer
Attorney, Agent, or Firm—William J. Sheehan; John R. Manning; Jerry L. Seemann

[57] ABSTRACT

A hand hold device (A) includes a housing (10) having a hand hold (14) and clamping brackets (32,34) for grasping and handling an object. A drive includes drive lever (23), spur gear (22), and rack gears (24,26) carried on rods (24a, 26a) for moving the clamping brackets. A lock includes ratchet gear (40) and pawl (42) biased between lock and unlock positions by a cantilever spring (46,48) and moved by handle (54). Compliant grip pads (32b, 34b) provide compliance to lock, unlock, and hold an object between the clamp brackets.

15 Claims, 3 Drawing Sheets

PORTABLE HAND HOLD DEVICE

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates to a portable hand hold device grasping and handling utility objects such as for providing an astronaut with a convenient and safe means of handling electronic "black" boxes or other units on orbiting space vehicles when they need replacing.

In the past, various means have been provided for handling various objects by hand. This is particularly a problem in space where the handling of objects requires precision and reliability. Manual removal, replacement and positioning of objects is somewhat tedious for various reasons including the zero gravity environment. Permanent hand holds have been installed on the units needed replacing but this necessitates the consumption of weight which is desired to be minimized as well as space.

Manual manipulation of replaceable units in orbit poses several problems. For one, some of the units have sharp corners which can cut or abrade an astronaut's gloved hand. Similarly, since the astronaut's dexterity is severely hampered by the pressurized suit, positioning accuracy and articulation capabilities suffer. The astronaut is in a compromising and uncomfortable position with poor visibility and a poor feel for alignment of bolt holes, etc. This enhances the probability of damaged hardware. Since hand manipulation of replaceable units is more cumbersome, time consumption is greater, thus adding to the cost and risk associated with the mission. As an alternate to hand removal, it has been proposed to outfit the replaceable unit with permanent handles, bolted or riveted to the box exterior. Since the majority of the replaceable units are already built, a very large cost in time would be incurred.

Accordingly, an object of the invention is to provide a portable hand hold device which can be easily adjusted in order to interface with various units and boxes for clamping and handling.

Another object of the invention is to provide a portable hand hold device for interfacing various units and boxes for replacement in orbit which has a discreet adjustment for effective telescoping ability and positive clamping.

SUMMARY OF THE INVENTION

The above objectives are accomplished according to the present invention by providing a hand held device having a pair of linear movement clamps which are locked by a fine tooth ratchet pawl locking mechanism. Rubber grip pads on the clamps provide a built in compliance which provides virtually infinite resolution capabilities without the need for trial and error mechanical adjustments such as found on locking pliers. Depending on the quantity of ratchet teeth, spur gear size, and whether or not the pawl is compounded, linear resolutions as small as 0.001 inches can be achieved. The device lends itself to use with a torque wrench in those instances when the linear clamping load is critical and would cause damage to hardware. Due to the free running rotational input required to effect clamping, the device lends itself easily to use with a torque wrench. The clamps are carried on double telescoping rods which provides compactness and allows for a large amount of extension capability per unextended length. This feature allows for a quick acting, small, easily stowed device for clamping units in boxes. The combination of a circular ratchet gear/pawl arrangement as a locking arrangement in a linear clamping device provide highly effective adjustment and clamping. The circular ratchet gear allows for a simple, effective lock with high resolution ability. For all practical purposes, the device is infinitely adjustable while providing a positive lock which is a one shot operation and requires no "tweaking" adjustment such as locking pliers. A spring loaded cam and pawl actuation mechanism wherein a detented cam is used to provide spring load to a pawl provides a highly efficient ratchet pawl mechanism. The spring loading may occur regardless of the direction in which the device is being ratcheted.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
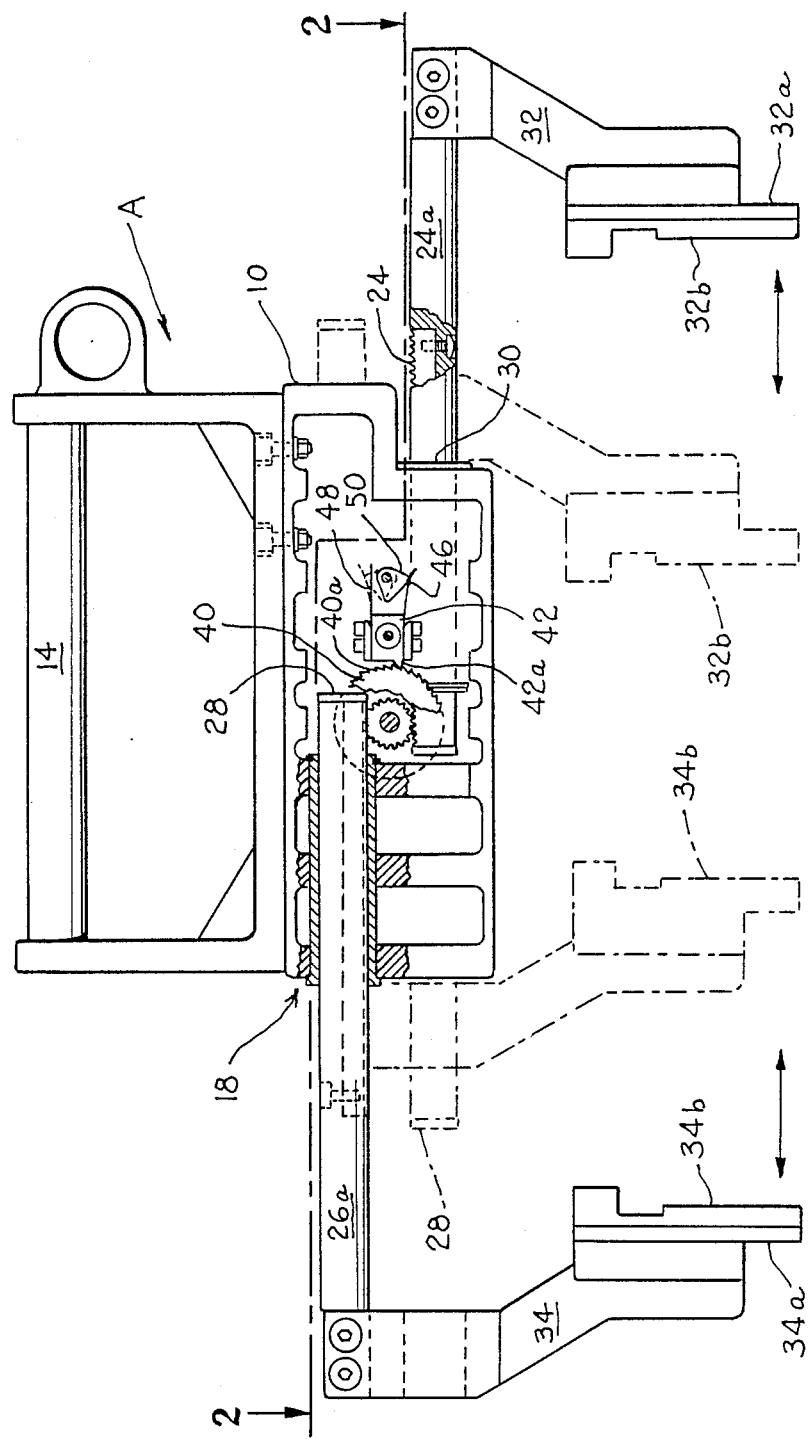
FIG. 1 is a front elevation with parts cut away illustrating a portable hand hold device for grasping and holding boxes and units for handling.
Figure 2:
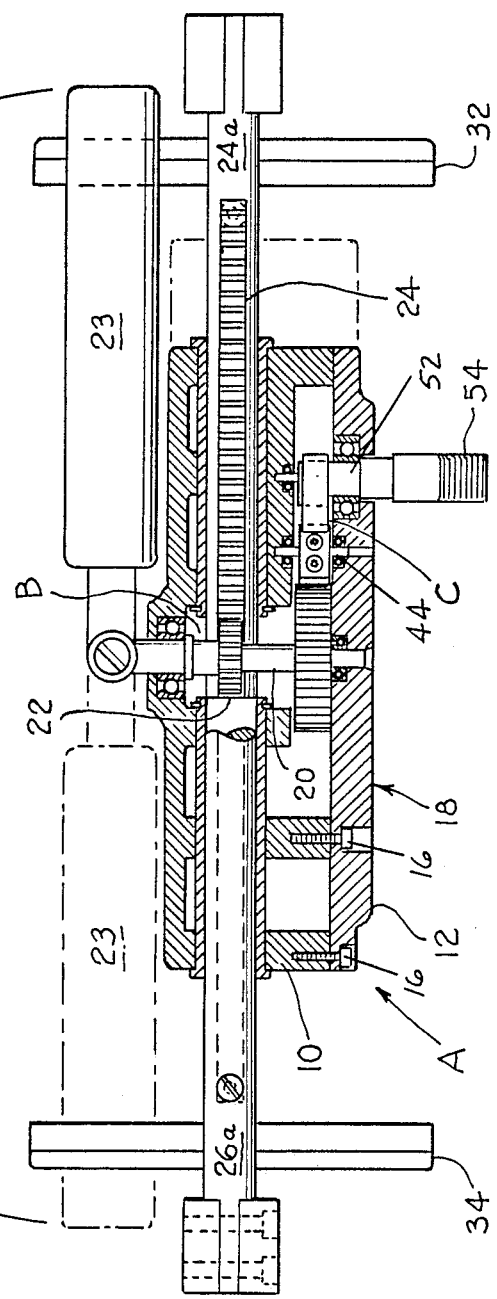
FIG. 2 is a top plan view of the device of FIG. 1 with parts cut away.

Referring now in more detail to the drawings, a portable hand hold device, designated generally as A, is illustrated, having a housing 10 and a housing cover 12. Housing 10, housing cover 12, and a hand hold 14 are attached together using conventional screw fasteners 16 to form a main body designated generally as 18 to encase the internal mechanism. Internal drive means B includes a pinion shaft 20 having a spur gear 22 affixed thereon. Pinion shaft 20 may be trunnioned between ball bearings located in the housing and the housing cover. Spur gear 22 engages two parallel rack gears 24, 26 carried on rods 24a, 26a respectively. Rack gears 24, 26 may be fastened to the rack carrier rods 24a, 26a in any suitable manner such as by using ordinary machine screws. Spur gear 22 is rotated through a lever 23 which drives rack rods 24a, 26a. To prevent over extension, a carrier stop 28 is fastened to the end of each rack carrier rod. The rack gears and rack carrier rods penetrate housing 10 through rack bushings 30. Carried on the ends of the rack carrier rods are clamp means in the form of clamp brackets 32, 34 and pad plates 32a, 34a having rubber grip pads 32b, 34b. The rubber grip pads may be attached to the pad plates by any suitable manner such as using rivets. The grip pads serve to prevent abrasive damage to the hardware, and provide a positive grip by adding compliance and friction to the system.

Lock means for locking the clamps of the hand hold device is illustrated generally at C. Lock means provides a positive clamping force to lock a captured unit of box to the device for replacement. As illustrated, lock means C includes a ratchet gear 40 which is mounted co-axially with spur gear 22 on pinion shaft 20. Teeth 40a of ratchet gear 40 are formed in a sixty degree saw tooth configuration so as to capture a mating pawl 42. The pads provide a built in compliance for the fine-tooth ratchet/pawl mechanism resulting in virtually infinite resolution without trial and error type adjustments. Pawl 42 is affixed to a pawl shaft 44 which is journaled by means of ball bearings in housing 10. Pawl 42 is spring loaded by means of biasing means in the form of a pair of cantilevered springs 46, 48, and a cam 50 positioned between the cantilever springs. Cam 50 is carried on a shaft 52 having a handle means 54 affixed to an end which extends through housing 10. Handle means 54 provides a pawl engaging lever. The pawl engaged cam 50 may be held in the lock/unlock position by a ball detent threaded through a detent holder fastened to housing cover 12 or by any suitable means such as machine screws. Stops precisely constrain cam movement to the 90° detent positions.

Figure 3:
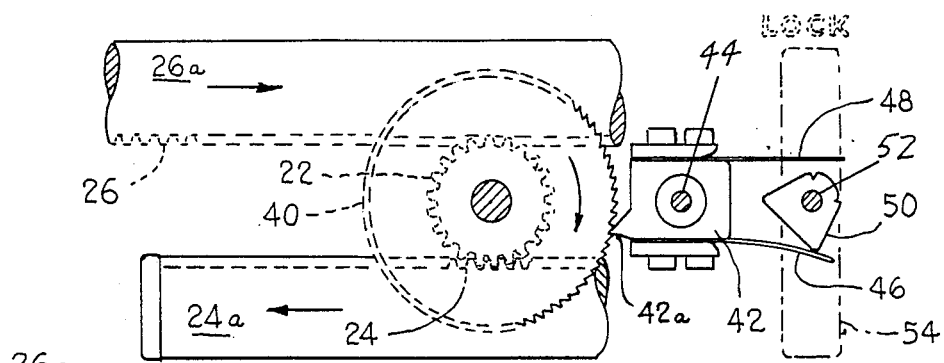
FIG. 3 is an enlarged view of a ratchet/pawl mechanism constructed in accordance with the present invention with the mechanism in a lock position.
Figure 4:
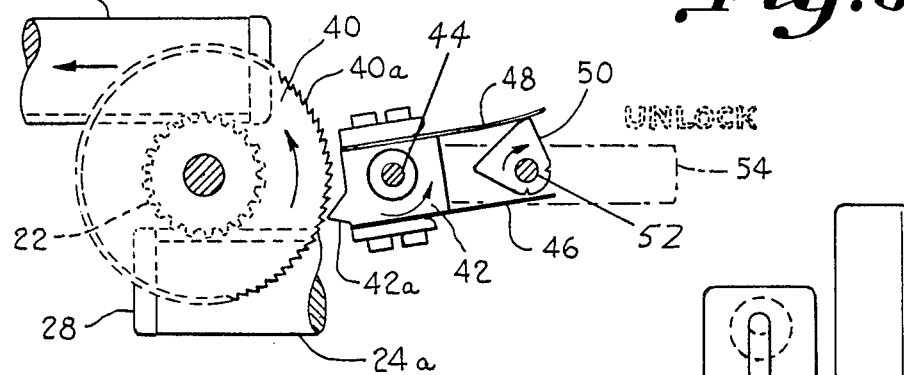
FIG. 4 is an enlarged view of a ratchet/pawl lock mechanism constructed in accordance with the present invention in an unlock position.
Figure 5:
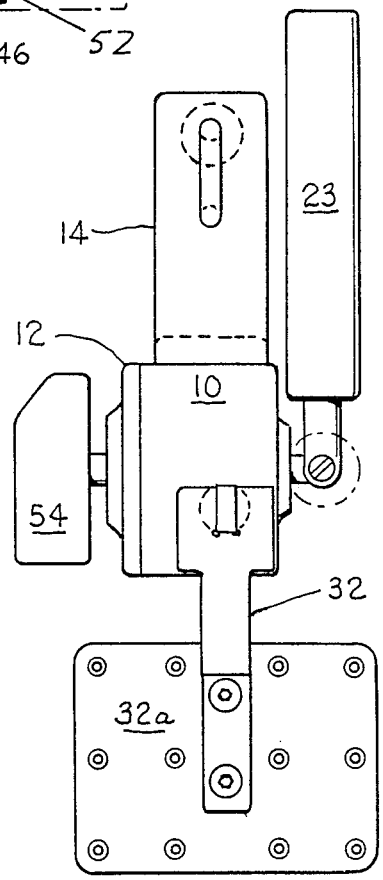
FIG. 5 is an end view of the device of FIG. 2.

In operation, to engage the lock means C comprising the ratchet/pawl mechanism, pawl engage handle 54 is turned to the lock position, as can best be seen in FIG. 3. This rotates cam 50 and spring loads tooth 42a of pawl 42 into engagement with ratchet gear 40. When lever 23 is turned so as to retract or close clamps 32, 34, ratchet gear 40 advances with respect to pawl 42. This causes pawl 42 to arc in and out of engagement with ratchet gear teeth 40a. As rack gears 24, 26 are driven back, cantilever spring 46, 48 causes the pawl to seek stability mating with a specific gear tooth. The locking is further augmented by the geometric relationship of the pawl, pawl shaft, and the point of tangency the pawl tooth shares with the ratchet gear 40. That is, as the clamping load increases, the pawl is load driven into further engagement. To disengage lock means C and the ratchet mechanism, pawl engagement lever 54 is turned to the unlock position, as can best be seen in FIG. 4. This action rotates cam 50 and spring loads pawl 42 as to disengage it. Lever handle 23 is then turned slightly so as to retract grip pads 32b, 34b. The grip pads compress slightly and allow ratchet gear 40 to advance. This unloads pawl 42 and allows cantilever springs 46, 48 to rotate pawl 42 out of engagement with ratchet teeth 40a.

Thus, it can be seen that a highly advantageous construction can be had for a hand hold device for gripping and clamping boxes and units for replacement in orbital maneuvers in space and the like. Precise adjustment and positive clamping are provided in a very simplistic form. Other embodiments may exist, for example, by changing the configuration of the grip surfaces, this device could be used to provide a portable hand hold for spherical vessels, tubular framework, trusses, etc. Swiveling or self-centering grip surfaces may also enhance capability. By adding a cable member or web length, the device could be used as a tension or load binder. This type of device could be used in a variety of applications such as the on-orbit storage and transportation of material such as tubing structures, panels, etc. Unlike the ratcheting cable devices and web type load binders currently in use, all of the mechanism is enclosed which enhances safety. Devices similar in nature can be used for on-orbit clamping or assembling where the proper amount of clamp load or pre-load is critical to the assembly. To accomplish this, a torque wrench, clutch, or similar load indicating mechanism could be used in lieu of the handle. Because of the proportionality between torque and clamp load, an accurate linear load value can be obtained by coupling this device with an input torque indicator such as torque wrench.

While a preferred embodiment of the invention has been described using specific terms, such description is for illustrative purposes only, and it is to be understood that changes and variations may be made without departing from the spirit or scope of the following claims.

What is claimed is:

1. A hand hold device for grasping and handling utility objects and the like comprising:
   a housing;
   a hand hold carried by said housing by which said housing may be manually held;
   a pair of rods carried by said housing for opposite reciprocal linear motion, said reciprocating rods having opposing ends;
   clamping means carried by said reciprocating rods for engaging said object;
   drive means for driving said rods and said reciprocating linear motion to clamp said object in a clamp position with a sufficient force to firmly hold said object; and
   a ratchet and pawl mechanism having a ratchet gear operatively connected to said drive means, an operator pawl having a pawl tooth for engaging the teeth of said ratchet gear, and a pawl handle for moving said pawl between a lock position and an unlock position and biasing means for maintaining said pawl in engagement with said ratchet gear in said lock position.

2. The device of claim 1 wherein said drive means includes rack gears carried by said reciprocating rods, a spur gear meshing with said rack gears carried by said rods for simultaneous movement of said rods, and lever means connected to said spur gear for rotating said spur gear in first and second directions to close said clamp means and open said clamp means respectively.

3. The device of claim 1 wherein said clamping means comprises clamping brackets appending downwardly from said reciprocating rods having grip pads which face each other and clamp said object, said grip pads including compliance means for resiliently yielding when a clamping force is applied upon said object in said clamp position. biasing means for maintaining said pawl in engagement with said ratchet gear in said lock position.

4. The device of claim 1 wherein said biasing means comprises a cantilever spring carried with said pawl having a first spring element and a second spring element carried generally in a cantilevered manner, and a cam carried between said first and second spring elements.

5. The device of claim 4 wherein said pawl handle is connected to said cam and rotates said cam against said first spring element to resiliently position said pawl in engagement with said ratchet gear in said lock position and to resiliently hold said pawl out of contact with said ratchet gear in said unlock position.

6. The device of claim 5 wherein said clamping means comprises clamp brackets carried by said opposing ends of said reciprocating rods, and compliant grip pads carried by said clamp brackets which resiliently yield to a clamping force upon said object, and said compliant grip pads yielding when said object in said clamped position upon further actuation of said drive means to allow said operator pawl to be resiliently moved to said unlock position.

7. The device of claim 5 wherein said pawl, a shaft upon which said pawl is carried, and a point at which said tooth of said pawl is tangent to said ratchet gear have a geometrical relationship which drives said pawl into further engagement with said ratchet gear as the clamping load is increased.

8. A hand hold device for grasping and handling utility objects and the like comprising:
- a housing;
- a hand hold carried by said housing by which said housing may be manually held;
- a pair of rods carried by said housing for opposite reciprocal linear motion, said reciprocating rods having opposing ends;
- clamping means carried by said reciprocating rods for engaging said object in a clamp position;
- drive means for driving said rods and said reciprocating linear motion to clamp said object with a sufficient force to firmly hold said object in said clamp position;
- a ratchet and pawl mechanism having a ratchet gear operatively connected to said drive means, an operator pawl having a pawl tooth for engaging the teeth of said ratchet gear, and a pawl handle for moving said pawl between a lock position and an unlock position and biasing means for maintaining said pawl in engagement with said ratchet gear in said lock position; and
- compliance means carried by said clamp means which allow said drive means to increase the clamping force upon said object in said clamp position so that said lock means may be released.

9. The device of claim 8 wherein said drive means includes rack gears carried by said reciprocating rods, a spur gear meshing with said rack gears carried by said rods for simultaneous movement of said rods, and lever means connected to said spur gear for rotating said spur gear in first and second directions to close said clamp means and open said clamp means respectively.

10. The device of claim 8 wherein said clamping means comprises clamping brackets appending downwardly from said reciprocating rods having grip pads which face each other and clamp said object, and said compliance means includes resilient pads carried by said clamping brackets for resiliently yielding when a clamping force is applied upon said object in said clamp position.

11. The device of claim 8 wherein said biasing means comprises a cantilever spring carried with said pawl having a first spring element and a second spring element carried generally in a cantilevered manner, and a cam carried between said, first and second spring elements.

12. The device of claim 11 wherein said pawl handle is connected to said cam and rotates said cam against said first spring element to resiliently position said pawl in engagement with said ratchet gear in said lock position and to resiliently hold said pawl out of contact with said ratchet gear in said unlock position.

13. The device of claim 12 wherein said clamping means comprises clamp brackets carried by said opposing ends of said reciprocating rods, and said compliance means includes compliant grip pads carried by said clamp brackets which resiliently yield to a clamping force upon said object, and said compliant grip pads yielding when said object in said clamped position upon further actuation of said drive means to allow said operator pawl to be resiliently moved to said unlock position.

14. The device of claim 12 wherein said pawl, a shaft upon which said pawl is carried, and a point at which said tooth of said pawl is tangent to said ratchet gear have a geometrical relationship which drives said pawl into further engagement with said ratchet gear as the clamping load is increased.

15. A device for manually grasping and handling a utility object comprising:
- a housing;
- a hand hold carried by said housing by which said housing may be manually gripped;
- a pair of linearly reciprocating rods slidably carried by said housing;
- drive means for driving said rods generally parallel to one another and said reciprocating motions;
- rack gears carried by said reciprocating rods;
- a spur gear simultaneously meshing with said rack gears of said reciprocating rods;
- a shaft rotatably journaled in said housing upon which said spur gear is carried;
- clamping brackets carried by said reciprocating rods for clamping said object in a clamp position under a clamping force, said clamping brackets having compliant surfaces which yield upon exertion of said clamping force;
- a ratchet gear carried on said shaft with said spur gear;
- a pawl carried on a pawl shaft within said housing said pawl having a pawl tooth in engagement with said ratchet gear;
- biasing means for biasing said pawl into engagement with said ratchet gear;
- a pawl handle carried by one end of said pawl shaft external to said housing for moving said pawl between a lock position and an unlock position; and
- said pawl being engaged with said ratchet gear but yielding to rotation of said drive shaft upon actuation of said drive means to allow said clamping brackets to move towards each other so that said object may be clamped with a compliant clamping force, and said compliant clamping surfaces of said clamping brackets allowing said lever means to drive said clamping brackets closer together so that said pawl may be pivoted out of contact with said ratchet for release of said clamping force when said pawl is in said unlock position.

* * * * *